United States Patent
Ellilä et al.

(10) Patent No.: US 12,492,414 B2
(45) Date of Patent: Dec. 9, 2025

(54) METHOD OF PRODUCING AN ORGANIC ACID IN A MIXTURE OF MOLASSES AND CALCIUM HYDROXIDE

(71) Applicant: FF-FUTURE OY, Salo (FI)

(72) Inventors: Simo Ellilä, VTT (FI); Marja Ilmen, VTT (FI); Eemeli Hytönen, VTT (FI)

(73) Assignee: FF-FUTURE OY, Salo (FI)

( * ) Notice: Subject to any disclaimer, the term of this patent is extended or adjusted under 35 U.S.C. 154(b) by 438 days.

(21) Appl. No.: 17/922,695

(22) PCT Filed: May 26, 2021

(86) PCT No.: PCT/EP2021/063969
§ 371 (c)(1),
(2) Date: Nov. 1, 2022

(87) PCT Pub. No.: WO2021/239770
PCT Pub. Date: Dec. 2, 2021

(65) Prior Publication Data
US 2023/0175024 A1    Jun. 8, 2023

(30) Foreign Application Priority Data
May 27, 2020 (FI) ...................................... 20205542

(51) Int. Cl.
*C12N 1/18* (2006.01)
*C12P 7/44* (2006.01)
*C12P 7/56* (2006.01)

(52) U.S. Cl.
CPC .................. *C12P 7/56* (2013.01); *C12N 1/18* (2013.01); *C12P 7/44* (2013.01)

(58) Field of Classification Search
CPC .... C12P 7/44; C12N 1/14; C12N 1/18; C12N 1/16
See application file for complete search history.

(56) References Cited

U.S. PATENT DOCUMENTS

| | | | |
|---|---|---|---|
| 3,997,357 A | 12/1976 | Schoenrock et al. | |
| 2008/0113072 A1* | 5/2008 | Lee ....................... | C13B 50/008 426/471 |

FOREIGN PATENT DOCUMENTS

| | | |
|---|---|---|
| CN | 103805525 A | 5/2014 |
| CN | 103614421 B | 5/2016 |
| CN | 107287362 A | 10/2017 |
| WO | 8201463 A1 | 5/1982 |
| WO | 2018207889 A1 | 11/2018 |

OTHER PUBLICATIONS

International Search Report and Written Opinion in Application No. PCT/EP2021/063969, mailed Oct. 14, 2021, 13 pages.
Search Report in Finnish Application No. 20205542, dated Dec. 12, 2020, 2 pages.
Maas, Ronald H.W., et al., "Lactic acid production from lime-treated wheat straw by: neutralization of acid by fed-batch addition of alkaline substrate", Appli Ed Microbiology and Biotechnology, Springer Berlin Heidelberg, Berlin/Heidelberg, vol. 78, No. 5' Apr. 1, 2008 (Apr. 1, 2008), pp. 751-758.
Wang, L. et al.: "Efficient production of 1-lactic acid from corncob molasses, a waste by-product in xylitol production, by a newly isolated xylose utilizing *Bacillus* sp. strain", Bioresource Technology, Elsevier, Amsterdam, NL, vol. 101, No. 20, Oct. 1, 2010 (Oct. 1, 2010), pp. 7908-7915.
Karp, Susan G., et al.: "Application of the biorefinery concept to produce-lactic acid from the soybean vinasse at laboratory and pilot scale", Bioresource Technology, Elsevier, Amsterdam, NL, vol. 102, No. 2, Aug. 27, 2010 (Aug. 27, 2010), pp. 1765-1772.
Montelongo, J.- L. et al. Lactobacillus salivarius for Conversion of Soy Molasses into Lactic Acid. Journal of Food Science 1993, vol. 58, No. No. 4, 863-866.
Savijoki K., Palva A. :Molecular Genetic Characterization of the L-Lactate Dehydrogenase Gene (IdhIL) of Lactobacillus helveticus and Biochemical Characterizaton of the Enzyme Appl. Environ. Microbiol. Jul. 1997 vol. 63, pp. 2850-2856.
Tokuhiro, K. et al. Double mutation of the PDC1 and ADH1 genes improves lactate production in yeast *Saccharomyces cerevisiae* expressing the bovine lactate dehydrogenase, Appl. Microbiol. Biotecnol Nov. 5, 2008, vol. 82, pp. 883-890.
Witte, V. et al. "Characterization of yeasts with high L[+]-lactic acid production: Lactic acid specifi csoft-agar overlay (LASSO) and TAFE-patterns."J. Basic Microbiol. 1989. vol 29, pp. 707-716.
Simila J. et al. "Cloning and Expression of a Thermostable alpha-Galcotsidase from the thermophilic fungus Talaromyces emersonii in the methylotrophic yeast Pichia pastoris" J Microbiol. Biotechnol. Oct. 6, 2012, vol. 20, No. 12, pp. 1653-1663.
Chen Z. et al. High-level exression of a novel alpha-galactosidase gene from Rhizomucor miehei in Pichia pastori and characterization of the recombinant enzyme, Protein Expression and Purification Feb. 12, 2015, vol. 110, pp. 107-114.
Skory, Christopher D. Isolation and expression of lactate dehydrogenase genes from Rhizopus oryzae Applied and Environmental Microbiology, Jun. 2000, vol. 6, No. 6, pp. 2343-2348.

* cited by examiner

*Primary Examiner* — Tekchand Saidha
(74) *Attorney, Agent, or Firm* — Meunier Carlin & Curfman LLC (57) ABSTRACT

The present invention relates to the fields of industrial biotechnology, renewable raw materials and production of organic acids. Specifically, the invention relates to a method of producing an organic acid or a salt thereof. Still, the present invention relates to a mixture comprising legume molasses and calcium hydroxide or a mixture obtained by combining a carbon substrate composition comprising legume molasses and an aqueous suspension comprising calcium hydroxide, for producing an organic acid or a salt thereof by a microorganism, and use of said mixture for producing an organic acid or a salt thereof. Still further, the present invention relates to a method of producing one or more products selected from the group consisting of polymers, polyesters and polylactic acids.

11 Claims, 3 Drawing Sheets

METHOD OF PRODUCING AN ORGANIC ACID IN A MIXTURE OF MOLASSES AND CALCIUM HYDROXIDE

CROSS REFERENCE TO RELATED APPLICATIONS

This application is a United States National Phase Patent Application of International Patent Application Number PCT/EP2021/063969, filed on May 26, 2021, which claims the benefit of priority to FI application No. 20205542, filed May 27, 2020.

FIELD OF THE INVENTION

The present invention relates to the fields of industrial biotechnology, renewable raw materials and production of organic acids. Specifically, the invention relates to a method of producing an organic acid or a salt thereof. Still, the present invention relates to a mixture comprising legume molasses and calcium hydroxide or a mixture obtained by combining a carbon substrate composition comprising legume molasses and an aqueous suspension comprising calcium hydroxide, for producing an organic acid or a salt thereof by a microorganism, and use of said mixture for producing an organic acid or a salt thereof. Still further, the present invention relates to a method of producing one or more products selected from the group consisting of polymers, polyesters and polylactic acids.

BACKGROUND OF THE INVENTION

Organic acids are an important class of molecules that are utilized in a wide array of applications spanning from food, feed and cosmetics to plastics etc. The importance of organic acids is increasing because there is an urgent need to replace petrochemical products with biobased alternatives. Organic acids can function as chemical building blocks for making many of the products derived from fossil sources today.

Biobased organic acids can compete with fossil derived compounds if their production is very economical. The primary contributor to costs of organic acid production is feedstock. Organic acids such as lactic acid and citric acid can be produced at an industrial scale via fermentation from relatively pure sources of glucose (starch) and sucrose. Typically corn starch or beet sugar are utilized in temperate climates and cane sugar in tropical and subtropical climates.

The use of low-cost raw materials could enable a cheaper production of organic acids. However, production of organic acids from available low-cost raw materials is not effective. For example, use of legume molasses is limited because complex oligosaccharides such as galacto-oligosaccharides are difficult to digest for most industrial microorganisms. Indeed, there remains a significant unmet need for simple and effective methods of producing organic acids by converting complex carbohydrates into organic acids.

BRIEF DESCRIPTION OF THE INVENTION

The objects of the invention, namely obtaining a simple and effective method for producing an organic acid or a salt thereof by culturing a microorganism as well as obtaining a mixture for production of said organic acid or salt thereof, are achieved by utilizing a specific combination of legume molasses and an aqueous suspension comprising calcium hydroxide.

The present invention enables overcoming the defects of the prior art including but not limited to a lack of a simple and effective method for converting complex carbohydrates of legume molasses into organic acids. Indeed, the method of the present invention allows a running use of alternative carbon substrates namely legume molasses for organic acid production by microorganisms in an industrial scale.

Use of legume molasses as a raw material for production of organic acids faces many hurdles in practice. In addition to carbohydrates legume molasses comprises myriad other compounds such as proteins, fats, cyclitols, saponins and ash. Fermentation feeds typically need to be sterilized but the high protein content of legume molasses makes the material difficult to sterilize using conventional thermal methods. Indeed, legume molasses proteins react with carbohydrates at elevated temperatures causing decreased levels of carbon substrates for conversion and formation of compounds inhibitory to microbial growth, thereby resulting in yield losses of organic acids. Furthermore, during fermentation saponins and other compounds (e.g. isoflavones, proteins or fatty acids) of legume molasses cause strong foam formation making the fermentation of legume molasses very difficult in practice. The present invention enables overcoming these drawbacks of the prior art by a specific fermentation feed comprising legume molasses. The present invention provides an ideal fermentation feed that requires no sterilization by high temperatures and/or pressures before addition to a microorganism culture and enables decreased foaming or no foaming during production of organic acids.

Indeed, in the present invention legume molasses can be used for production of organic acids without complicated pretreatments of molasses (such as: acidification, boiling or neutralization) before the fermentation. Indeed, just a combination of a carbon substrate composition comprising legume molasses and an aqueous suspension comprising calcium hydroxide enables the simple and excellent method of the present invention.

As is known by a person skilled in the art calcium hydroxide $(Ca(OH)_2)$ is practically insoluble in water and its use for pH control in fermentation processes is very tedious. Surprisingly, the authors have now found that while calcium hydroxide mixes poorly with legume molasses, aqueous suspensions of calcium hydroxide (milk of lime) form a homogeneous suspension when combined with said molasses. The resulting mixture was found to be an excellent feed for production of organic acids via fermentation. Calcium hydroxide can be used for raising the pH of the mixture to at least 11 enabling inhibition of microbes in the feed, thus potentially saving energy from costly thermal sterilization. In addition, the alkaline conditions dramatically reduce the ability of soy molasses to form foam in the fermentation. The treatment of legume molasses with calcium hydroxide leads to the precipitation of major amounts of protein and fat, resulting in an organic acid stream that is easier to process downstream. The relative amount of calcium hydroxide in a mixture comprising legume molasses can be adjusted for the specific needs of the fermentation process.

And still, the present invention provides a simple solution for neutralizing organic acids formed via culturing microorganisms by utilizing a mixture comprising molasses and calcium hydroxide.

Taken together, the method or mixture of the present invention surprisingly simplifies organic acid production methods of the prior art at least by removing the conventional sterilization step of fermentation feeds, decreasing foam formation during fermentation and neutralizing the produced organic acids. At least all said advantages are obtained by utilizing a mixture comprising a carbon substrate composition comprising legume molasses and an aqueous suspension comprising calcium hydroxide. Indeed, with a specific fermentation feed mixture of the present invention culturing conditions (including but not limited to pH) and thereby also production of organic acids can be continuously or sequentially controlled. Said mixture enables easy manipulation and control of a carbon source and culture conditions during large-scale production processes, which provides manufacturers with flexibility and excellent control over said processes:

The present invention relates to a method of producing an organic acid or a salt thereof, wherein said method comprises combining a carbon substrate composition comprising legume molasses and an aqueous suspension comprising calcium hydroxide to obtain a mixture, wherein said mixture has a calcium hydroxide content of at least 4 g (dry weight)/100 g (dry weight) of legume molasses, and culturing a microorganism in a medium comprising said mixture to obtain an organic acid or a salt thereof.

Also, the present invention relates to a mixture comprising a carbon substrate comprising legume molasses and an aqueous suspension comprising calcium hydroxide for producing an organic acid or a salt thereof by a microorganism, wherein the mixture has a calcium hydroxide content of at least 4 g/100 g (dry weight) of legume molasses.

Also, the present invention relates to a mixture comprising legume molasses and calcium hydroxide for producing an organic acid or a salt thereof by a microorganism, wherein the mixture has a calcium hydroxide content of at least 4 g/100 g (dry weight) of legume molasses, or the present invention relates to a mixture obtained by combining a carbon substrate comprising legume molasses and an aqueous suspension comprising calcium hydroxide for producing an organic acid or a salt thereof by a microorganism, wherein the mixture has a calcium hydroxide content of at least 4 g/100 g (dry weight) of legume molasses.

Still, the present invention relates to use of the mixture of the present invention for producing an organic acid or a salt thereof in a microorganism culture.

Still further, the present invention relates to a method of producing one or more products selected from the group consisting of polymers, polyesters and polylactic acids, said method comprising culturing a microorganism in a medium comprising legume molasses and calcium hydroxide or comprising the mixture of the present invention to produce an organic acid or a salt thereof, and utilizing the produced organic acid or salt thereof in production of polymers, polyesters and/or polylactic acids.

Other objects, details and advantages of the present invention will become apparent from the following drawings, detailed description and examples.

DETAILED DESCRIPTION OF THE INVENTION

The inventors of the present disclosure have combined a carbon substrate composition comprising legume molasses and an aqueous suspension comprising calcium hydroxide to obtain a mixture, which can be used in producing organic acids via culturing microorganisms. The mixture of the present invention for producing an organic acid or a salt thereof comprises legume molasses and calcium hydroxide or is obtained by combining a carbon substrate composition comprising legume molasses and an aqueous suspension comprising calcium hydroxide by a microorganism, wherein optionally the mixture has a calcium hydroxide content of at least 4 g/100 g (dry weight) of legume molasses. In the method of the present invention for producing an organic acid or a salt thereof, a carbon substrate composition comprising legume molasses and an aqueous suspension comprising calcium hydroxide are combined to obtain a mixture, wherein said mixture has a calcium hydroxide content of at least 4 g (dry weight)/100 g (dry weight) of legume molasses, and a microorganism is cultured in a medium comprising said mixture to obtain an organic acid or a salt thereof.

The present invention utilizes a carbon substrate composition comprising legume molasses for obtaining a mixture. As used herein "a legume" refers to a plant of the family Fabaceae or Leguminosae, or any part (such as a root, leaf), fruit, or seed thereof. "Molasses" refers to a product resulting from refining a bean, plant, beet or fruit into sugar. Legume molasses is a low-cost carbon source and could be used for the production of organic acids. However, its use in practice is challenging due to its diverse composition including complex carbohydrates (nonconventional oligosaccharides) and particularly high content of protein and saponins.

The carbon substrate used in the present invention may be obtained or may be from any carbon containing material, e.g. a combination of different carbon containing materials. In one embodiment the carbon substrate, legume molasses or galacto-oligosaccharides are from soya, fava bean, broad bean, peas, chickpeas, or any combination thereof; or the carbon substrate or legume molasses comprises molasses of soya, fava bean, broad bean, peas and/or chickpeas. Legume molasses can be used as a carbon substrate as such for microbial organic acid production; in most embodiments there are no additional nutrient requirements, which further helps to minimize production costs of organic acids.

As an example, soy molasses is a side product of soy protein concentrate production. This is a low value stream that is normally destined to animal feed production or even burned. However, it may contain a very high concentration of soy carbohydrates (e.g. >300 g/L) that could be valorized. The challenge is that the sugars are nonconventional oligosaccharides such as raffinose and stachyose that need to be hydrolyzed and then all the resulting monosaccharides glucose, fructose and galactose need to be metabolized into a product. Soy molasses is an example of a cheaper feedstock for organic acid production compared to e.g. corn starch and sucrose. Soy molasses can be used as a carbon substrate as such for microbial organic acid production.

In the present invention, an organic acid may be produced by culturing a micro-organism in a medium comprising a carbon substrate comprising complex carbohydrates and optionally simple carbohydrates. As used herein "a complex carbohydrate" refers to a polysaccharide comprising three or more linked sugars. Indeed, it takes longer to break down a polysaccharide than a shorter non-polysaccharide. As used herein "a simple carbohydrate" refers to a simple sugar, which can be categorized as a single sugar (a monosaccharide) such as glucose, fructose or galactose, or a double sugar (a disaccharide) such as sucrose, lactose and maltose.

Surprisingly, in the method of the present invention complex carbohydrates, e.g. of soy molasses, can be utilized as a carbon substrate. In a specific embodiment of the invention, the carbon substrate comprises complex carbohydrates or is a complex carbohydrate. In a more specific embodiment, the carbon substrate comprises galacto-oligosaccharides or is a galacto-oligosaccharide. The most common galacto-oligosaccharides found in plant materials are the raffinose family oligosaccharides (RFOs). These molecules are derivatives of sucrose, with additional $\alpha$-(1$\rightarrow$6)-linked galactosyl moieties. The different RFO sugars according to the number of linked galactosyl units include raffinose (one galactose unit), stachyose (two galactose units), verbascose (three galactose units) and ajucose (four galactose units). In addition to RFOs, e.g. legumes may contain other galacto-oligosaccharides that contain terminal inositol groups, such as those belonging to the galactinol, galactopinitol and fagopyritol series of carbohydrates. In one embodiment of the invention the mixture, legume molasses, carbon substrate or carbon substrate composition comprises galacto-oligosaccharides at least about 10%, 20%, 30%, 40%, 50%, 60%, 70%, 80%, or 90% by weight (e.g. dry weight) of the total carbohydrates in said mixture, legume molasses or carbon substrate, respectively. In one embodiment of the invention the mixture, legume molasses, carbon substrate or carbon substrate composition comprises complex carbohydrates or galacto-oligosaccharides at least about 10%, 20%, 30%, 40%, 50%, 60%, 70%, 80%, or 90% by weight (e.g. dry weight) of the total carbohydrates in said mixture, legume molasses or carbon substrate, respectively, and/or simple carbohydrates (e.g. glucose, fructose, galactose, sucrose, lactose or maltose or any combination thereof) at least about 10%, 20%, 30%, 40%, 50%, 60%, 70%, 80% or 90% by weight (e.g. dry weight) of the total carbohydrates in said mixture, legume molasses or carbon substrate, respectively.

In one embodiment the mixture, legume molasses, carbon substrate or carbon substrate composition comprises at least 10%, 20%, 30%, 40%, 50%, 60%, 70%, 80%, 90%, or 95% legume molasses by weight (e.g. dry weight) of the mixture, legume molasses or carbon substrate or carbon substrate composition, respectively.

In one embodiment of the invention the legume molasses, carbon substrate or carbon substrate composition comprises a galacto-oligosaccharide or galacto-oligosaccharides, which is/are selected from the group consisting of melibiose, manninotriose, manninotetraose, raffinose, stachyose, verbascose, ajucose, galactinol, digalactosyl myo-inositol, galactopinitol A, galactopinitol B, ciceritol, fagopyritol B1, fagopyritol B2 and any combination thereof. In a specific embodiment the galacto-oligosaccharides are one or several from the group consisting of raffinose, stachyose, verbascose, melibiose, manninotriose and manninotetraose.

In one embodiment the legume molasses, carbon substrate or carbon substrate composition comprises glucose, fructose, galactose, sucrose, lactose, maltose, starch, cellulose and/or any combination thereof. As used herein "starch" refers to a polymeric carbohydrate having the formula $(C_6H_{10}O_5)_n$—$(H_2O)$, i.e. comprising or consisting of a large number of glucose units joined by glycosidic bonds. As used herein "cellulose" refers to an organic compound with the formula $(C_6H_{10}O_5)_n$, a polysaccharide consisting of a linear chain of several (e.g. from a hundred to many thousands) $\beta$(1-4) linked D-glucose units.

In addition to a carbon substrate, an aqueous suspension comprising calcium hydroxide is utilized for obtaining a mixture for culturing a micro-organism and producing an organic acid. The aqueous suspension (optionally a homogenous suspension) comprising calcium hydroxide can comprise or consist of limewater (limewater is the common name for a dilute aqueous solution of calcium hydroxide) or milk of lime. In one embodiment the aqueous suspension consists of calcium hydroxide and water. The aqueous suspension comprising calcium hydroxide may be prepared for example by mixing calcium oxide (CaO) (which reacts with water to form calcium hydroxide ($Ca(OH)_2$)) or calcium hydroxide ($Ca(OH)_2$) with water. If excess calcium hydroxide is added or conditions are altered, e.g. the temperature raised sufficiently, a milky solution results due to the homogeneous suspension of excess calcium hydroxide. This liquid is known by a skilled person as milk of lime.

A carbon substrate or carbon substrate composition comprising legume molasses can be combined with an aqueous suspension comprising calcium hydroxide by any method known to a person skilled in the art such as by adding the carbon substrate or carbon substrate composition to the aqueous suspension or vice versa, or by adding both the carbon substrate (composition) and aqueous suspension at the same time to a container. In one embodiment the method comprises mixing said carbon substrate (composition) and aqueous suspension. In one embodiment an aqueous suspension of calcium hydroxide (e.g. milk of lime) is combined with legume molasses to obtain a mixture with a specific calcium hydroxide content. The aqueous suspension (e.g. homogenous suspension) used in the present invention enables surprising and excellent mixing with a carbon substrate composition comprising legume molasses, and therefore an effective and well controlled method for producing organic acids or salts thereof can be obtained.

In one embodiment a temperature of the carbon substrate composition is about 80° C. or less, 70° C. or less, 60° C. or less, or 50° C. or less when it is combined with the aqueous suspension comprising calcium hydroxide, and/or wherein the mixture has a temperature about 80° C. or less, 70° C. or less. 60° C. or less, 50° C. or less, or 40° C. or less when said mixture is added or is for addition to the medium for culturing the microorganism.

In one embodiment sterilization of the mixture, carbon substrate (composition) or legume molasses optionally in a high temperature and/or pressure is not needed for producing the organic acid or salt thereof. Indeed, the obtained mixture of the present invention can be added to the microorganism culture when needed. Lack of a sterilization step of the mixture or carbon substrate (composition) by high temperature and/or pressure and optionally also lack of a following cooling step enables a simpler, faster and cheaper method of the present invention. Aseptic or near-aseptic conditions of the feed mixture can be obtained by the aqueous suspension comprising calcium hydroxide.

The aqueous suspension comprising calcium hydroxide can result in precipitation of major amounts of protein and fat of legume molasses. In one embodiment of the invention a production of foam is decreased compared to a method of producing an organic acid or a salt thereof from legume molasses wherein an aqueous suspension comprising calcium hydroxide is not utilized. Decreased foaming caused by degraded saponins (amphipathic glycosides) and/or reduced isoflavone content enables efficient fermentation and production of organic acids.

The mixture comprising a carbon substrate (composition) comprising legume molasses and an aqueous suspension comprising calcium hydroxide can have a calcium hydroxide content of at least 4 g (dry weight)/100 g (dry weight) of legume molasses (e.g. 4-30 or 4-20 g (dry weight)/100 g (dry weight) of legume molasses). In one embodiment the mixture has a calcium hydroxide content of at least 4.5, at least 5, at least 5.5, at least 6, at least 6.5, at least 7, at least 7.5, at least 8, at least 8.5, at least 9, at least 9.5, at least 10, at least 11, at least 12, at least 13, at least 14, at least 15, at least 20, at least 25 or at least 30 g (dry weight)/100 g (dry weight) of legume molasses. In one embodiment the mixture has a calcium hydroxide content 4-20, 4-17.5, 4.5-15, 5-12.5 or 5.5-10 g (dry weight)/100 g (dry weight) of legume molasses. In one embodiment the mixture has a calcium hydroxide content of at least 4, at least 4.5, at least 5, at least 5.5, at least 6, at least 6.5, at least 7, at least 7.5, at least 8, at least 8.5, at least 9, at least 9.5, at least 10, at least 11, at least 12, at least 13, at least 14, at least 15, at least 20, at least 25, or at least 30 g (dry weight)/100 g (dry weight) of legume molasses, and/or the mixture has pH at least 11. The pH of the mixture can be e.g. at least 11, at least 11.5, at least 12, at least 12.5, or 13 (such as 11-11.5, 11-12 or 11-12.5) enabling sterilization of the mixture and/or decreasing foaming of the mixture during culturing of the microorganisms and thus providing optimal conditions for producing organic acids or salts thereof.

In one embodiment the mixture comprises at least 10%, 20%, 30%, 40%, 50%, 60%, 70%, 80%, 90%, or 95% legume molasses by weight (e.g. dry weight) of the mixture and the mixture has a calcium hydroxide content of at least 4, at least 4.5, or at least 5 g (dry weight)/100 g (dry weight) of legume molasses. In one embodiment the mixture comprises galacto-oligosaccharides at least about 10%, 20%, 30%, 40%, 50%, 60%, 70%, 80%, or 90% by weight (e.g. dry weight) of the total carbohydrates in said mixture and the mixture has a calcium hydroxide content of at least 4, at least 4.5, at least 5, at least 5.5 or at least 6 g (dry weight)/100 g (dry weight) of legume molasses. In one embodiment the amount of calcium hydroxide is chosen based on the amount of total carbohydrates in the mixture, and can be at least 9, at least 12, at least 5, or at least 20 g (dry weight)/100 g (dry weight) of the total carbohydrates in the mixture. Indeed, in a specific embodiment the amount of carbohydrates and alkali are controlled to obtain optimal conditions for producing organic acids.

Addition of calcium hydroxide can decrease or increase viscosity of a carbon substrate composition comprising legume molasses. In one embodiment the mixture of the present invention has a decreased viscosity compared to a mixture comprising a carbon substrate comprising legume molasses without an aqueous suspension comprising calcium hydroxide.

In one embodiment of the invention the mixture is a homogeneous suspension.

To produce an organic acid or a salt thereof a microorganism is cultured in a medium comprising the mixture of the present invention as an appropriate carbon source and optionally one or more ingredients selected from the group consisting of nitrogen or a source of nitrogen (such as amino acids, proteins, inorganic nitrogen sources such as ammonia or ammonium salts), yeast extract, peptone, minerals and vitamins. In one embodiment the medium used in the present invention is any commercial medium suitable for culturing microorganisms such as a bacterium or fungus. In one embodiment, culturing of the microorganism is carried out in suitable conditions known to a person skilled in the art. Suitable cultivation conditions, such as a temperature, pH, cell density, selection of nutrients, and the like are within the scope of the present invention and can be modified and/or controlled. In a specific embodiment the cultivation temperature is from about 25 to 45° C. (e.g. about 30-37° C. or 32-35° C.) and/or the pH of the medium is 2-10 (e.g. 3-6).

For example, production of organic acids (e.g. lactic acids or lactate) by microorganisms can decrease pH of the microorganism culture. In one embodiment pH of the medium, wherein the microorganism is cultured, is controlled by adding the mixture or the aqueous suspension comprising calcium hydroxide to said medium. Naturally, suitable cultivation conditions may depend on the specific microorganism. The culturing conditions can be maintained during the method of producing organic acids or alternatively, they can be adjusted periodically or continuously. In one embodiment, the culture conditions may vary in different tanks when more than one tank are used in the method for producing an organic acid or salt thereof.

The mixture comprising legume molasses and calcium hydroxide can be added to the culture medium e.g. continuously or periodically. In one preferred embodiment, the mixture is added to the culture medium to maintain a constant pH. Suitable constant pH values can be, for example, 2.5, 3.0, 3.5, 4.0, 4.5, 5.0, 5.5 or any other pH value. In some preferred embodiments, pH is maintained stable and finally allowed to decrease naturally. Any methods known by a person skilled in the art can be used for adding the mixture to the microorganism culture. The present invention also concerns a culture medium for a microorganism, wherein said medium comprises the mixture of the present invention.

In one embodiment of the invention the organic acid or salt thereof is produced by an anaerobic, microaerobic or aerobic fermentation.

In one embodiment culturing of the microorganism is carried out as a continuous fermentation method or as a batch or fed-batch fermentation method.

In one embodiment agitation of the microorganism culture is utilized in the method for producing an organic acid or a salt thereof.

In one embodiment of the invention after culturing the microorganism in a medium, the method further comprises recovering the resulting organic acid from the medium. Indeed, recovering can be carried out from the medium without disrupting the cells or from the cells e.g. after disrupting said cells. In one embodiment after culturing the microorganism in a medium, the method further comprises isolating and/or purifying the organic acid or salt thereof. Any suitable method known to a person skilled in the art can be used to isolate an organic acid or salt thereof. For example, common separation techniques can be used to remove the biomass from the medium, and common isolation procedures can be used to obtain organic acid or salt thereof from the microorganism-free media. An organic acid or salt thereof can be isolated while it is being produced, or it can be isolated from the media after production of the organic acid or salt thereof has been terminated. An organic acid or salt thereof can be recovered, isolated and/or purified by using any conventional methods known in the art such as adsorption, ion exchange procedures, chromatographic methods, two phase extraction, molecular distillation, melt crystallization, extraction, distillation or any combination thereof.

In one embodiment of the invention the organic acid or salt thereof is selected from the group consisting of a lactic acid, acetic acid, formic acid, pyruvic acid, butyric acid, citric acid, oxalic acid, glycolic acid, gluconic acid, and furan-dicarboxylic acid (FDCA), or any combination thereof. As used herein "lactic acid" refers to an organic acid having a molecular formula $CH_3CH(OH)CO_2H$ (chemical formula $C_3H_6O_3$). In industry lactic acid fermentation is performed by microorganisms converting carbon substrates to lactic acid.

The lactic acid occurs in two stereoisomeric forms. D and L lactic acid, and in a so-called racemic mixture of these isomers. In one embodiment the lactic acid produced by the method or microorganism of the present invention is L-lactic acid isomer or D-lactic acid isomer or a combination thereof. In one embodiment the lactic acid is optically pure lactic acid isomer, typically L-lactic acid isomer. As used herein "optically pure lactic acid isomer" refers to a solution or solid comprising substantially only one stereoisomeric form of lactic acid and not its mirror image (e.g. about 95% or more, about 96% or more, about 97% or more, about 98% or more, or about 99% or more (e.g. 99.5% or more) of one stereoisomeric form of lactic acid). Surprisingly, the method and mixture of the present invention enable production of pure L-lactic acid isomer with high yield, titer and productivity for industrially economical operation.

In one embodiment the method of the present invention further comprises preparing a polymer, polyester or polylactic acid (PLA) from the obtained organic acid or salt thereof. PLA, a thermoplastic aliphatic polyester, can be prepared from lactic acid, e.g. from the lactic acid produced and optionally recovered, isolated and/or purified by the method of present invention, by different methods including but not limited to the following: the ring-opening polymerization of lactide (derived from lactic acid) with various metal catalysts, direct condensation of lactic acid monomers, polymerization of lactic acid, contacting lactic acid with a zeolite, direct biosynthesis of PLA from lactic acid. In one embodiment the method of the present invention comprises preparing PLA from the obtained lactic acid. Currently the cost of e.g. PLA is not competitive with synthetic plastics. However, the present invention allows reduction of production costs of polymers such as PLA or polyesters.

In one embodiment the mixture of the present invention is for the method of the present invention for producing an organic acid or a salt thereof.

Any microorganism suitable for producing organic acids or salts thereof can be cultured in the method of the present invention. Also, the mixture of the present invention can be for any microorganism suitable for producing organic acids or salts thereof. In one embodiment the microorganism is a bacterium or fungus, optionally a yeast or filamentous fungus. In a specific embodiment the microorganism is a yeast or filamentous fungus selected from the genera *Aspergillus*, *Saccharomyces*, *Kluyveromyces*, *Pichia*, *Hansenula*, *Candida*, *Trichosporon*, *Rhizopus*, *Torulaspora*, *Issatchenkia* and *Scheffersomyces*, e.g. specifically from the group consisting of *Saccharomyces cerevisiae*, *S. uvarum*, *Kluyveromyces thermotolerans*, *K. lactis*, *K. marxianus*, *Hansenula polymorpha*, *Scheffersomyces stipitis*, *Rhizopus oryzae*, *Torulaspora pretoriensis*, *Issatchenkia orientalis*, *Pichia fermentans*, *P. galeiformis*, *P. deserticola*, *P. membranifaciens*, *P. jadinii*, *P. kudriavzevii*, *P. anomala*, *Candida ethanolica*, *C. sonorensis* and *C. apicola*.

In one embodiment the microorganism (e.g. a bacterium or fungus) has been genetically modified. Suitable genetic modifications include but are not limited to e.g. to increase lactate dehydrogenase enzyme and/or alfa-galactosidase enzyme activities. In one embodiment the microorganism (e.g. a bacterium or fungus) has been genetically modified to overexpress a gene encoding a lactate dehydrogenase and/or a gene encoding an alfa-galactosidase. In one embodiment the alfa-galactosidase enzyme is a heterologous alfa-galactosidase enzyme and/or the lactate dehydrogenase enzyme is a heterologous lactate dehydrogenase enzyme.

As used herein "lactate dehydrogenase enzyme activity" refers to an ability to catalyze conversion of pyruvate to lactate. Accordingly, "lactate dehydrogenase enzyme" refers to a protein having activity to convert pyruvate to lactate. An L-lactate dehydrogenase (L-LDH) enzyme converts pyruvate to L-lactate and a D-lactate dehydrogenase (D-LDH) enzyme converts pyruvate to D-lactate. L-lactate dehydrogenase and D-lactate dehydrogenase are classified as EC 1.1.1.27 and 20 EC 1.1.1.28, respectively. Lactate dehydrogenase (LDH) refers to not only fungal or bacterial (such as *Rhizopus oryzae* or *Lactobacillus helveticus*) but also to any other LDH homologue from any micro-organism, organism or mammal, e.g. a bovine. Also, all isozymes, isoforms and variants are included with the scope of LDH. In a specific embodiment, the LDH is an L-LDH. The LDH protein and Idh gene of the *R. oryzae* IdhA (AF226154) and IdhB (AF226155) are identified in the article of Skory (2000 Appl. Environ. Microbiol. 66:2343-2348) and the *L. helveticus* ldhL (U07604) is identified in the article of Savijoki K., Palva A. (1997. Appl. Environ. Microbiol. 63:2850-2856), respectively. Examples of suitable open reading frames (ORF) include but are not limited to ORF of *R. oryzae* IdhA (Q9P4B6) and IdhB (Q9P4B5) and *L. helveticus* ldhL (CAB03618). As an example, Idh1, Idh2, Idh3, Idh4, Idh5, Idh6A, Idh6B, IdhA, IdhB, IdhC and IdhL encode related but not identical polypeptides, which are within the scope of Idh. The number of genes encoding related but not identical polypeptides depends on the micro-organism or organism in question.

As used herein "alfa-galactosidase enzyme activity" refers to an ability to catalyse the hydrolysis of the non-reducing terminal α-galactosyl residues from variousi-galactosides, including galactose and raffinose oligosaccharides, galactomannans and galactolipids. Accordingly, "alfa-galactosidase enzyme" refers to a protein having activity to hydrolyze the non-reducing terminal α-galactosyl residues from various α-galactosides. Alfa-galactosidase is classified as EC 3.2.1.22. Alfa-galactosidase refers to not only fungal (such as *S. cerevisiae*) or bacterial but also to any other alfa-galactosidase homologue from any micro-organism or organism. Also, all isozymes, isoforms and variants are included with the scope of alfa-galactosidase. As an example (e.g. *T. reesei*) agl1, ag/2 and agl3, (e.g. *Aspergillus niger*) aglA, aglB, aglC and aglD, and (e.g. *S. cerevisiae*) MEL1, MEL2, MEL5, and MEL6 encode related but not identical polypeptides, which are within the scope of alfa-galactosidase. The number of genes encoding related but not identical polypeptides depends on the micro-organism or organism in question.

A microorganism suitable for the present invention can comprise a genetic modification increasing protein or enzyme activity. As used herein, "increased protein or enzyme activity" refers to the presence of higher activity of a protein compared to a wild type protein, or higher total protein activity of a cell or fungus compared to an unmodified cell or fungus. Increased protein activity may result from up-regulation of the polypeptide expression, up-regulation of the gene expression, addition of at least part of a gene (including addition of gene copies or addition of a gene normally absent in said cell or fungus), increase of proteins and/or increased activity of a protein. Genetic modifications resulting in increased protein activity include but are not limited to genetic insertions, deletions or disruptions of one or more genes or a fragment(s) thereof or insertions, deletions, disruptions or substitutions of one or more nucleotides, or addition of plasmids. As used herein "disruption" refers to insertion of one or several nucleotides into the gene or polynucleotide sequence resulting in lack of the corresponding protein or presence of non-functional proteins or protein with lowered activity.

The presence, absence or amount of protein activities in a cell or fungus can be detected by any suitable method known in the art. Non-limiting examples of suitable detection methods include commercial kits on market, enzymatic assays, immunological detection methods (e.g., antibodies specific for said proteins), PCR based assays (e.g., qPCR, RT-PCR), and any combination thereof. In one specific embodiment the activity of the lactate dehydrogenase enzyme is determined by monitoring the absorbance after incubating the enzyme or fungus in the presence of lithium lactate and NAD+ e.g. as described in Tokuhiro et al. (2009, Appl Microbiol Biotechnol 82, 883-890) and/or the activity of the alfa-galactosidase enzyme is determined by measuring released ρ-nitrophenyl (ϕNP) after incubating the enzyme or fungus with ρ-nitrophenyl-α-galactopyranoside (ϕNPG) e.g. as described in Chen et al. (2015, Protein Expression and purification, 110, 107-114) and/or by measuring released methylumbelliferyl (MU) after incubating the enzyme or fungus with methylumbelliferyl-α-D-galactopyranoside (MUG) e.g. as described in Similä et al. (2010, J Microbiol Biotechnol, 20 (12), 1653-1663).

In one embodiment the genetically modified microorganism is a recombinant microorganism. As used herein, a "recombinant microorganism" refers to any microorganism that has been genetically modified to contain different genetic material compared to the microorganism before modification (e.g. comprises a deletion, substitution, disruption or insertion of one or more nucleic acids including an entire gene(s) or parts thereof compared to the microorganism before modification).

In one embodiment of the invention, the microorganism is a fungus deposited on 26 Aug. 2019 to the VTT Collection under the accession number VTT C-191026. The following strain depositions according to the Budapest Treaty on the International Recognition of Deposit of Microorganisms for the Purposes of Patent Procedure have been made at the VTT Culture Collection, P.O. Box 1000 (Vuorimiehentie 3), FI-02044 VTT, Finland: accession number VTT C-191026.

In one embodiment the method for producing an organic acid or salt thereof can result in organic acid or lactic acid titers of about 30, 40, 50, 60, 70, 80, 90, 100, 110, 120, or 130 grams/L or more and/or organic acid or lactic acid productivities of about 0 5, 1.0, 1.5, 2.0, 2.5, 3.0 g $L^{-1}$ $h^{-1}$ or more. In one embodiment the method for producing an organic acid or salt thereof can result in titers of a salt of an organic acid or lactate titers of about 30, 40, 50, 60, 70, 80, 90, 100, 110, 120, or 130 grams/L or more, and/or salt or lactate productivities of about 0.5, 1.0, 1.5, 2.0, 2.5, 3.0 g $L^{-1}$ $h^{-1}$ or more. In one embodiment the method and/or microorganism used in the present invention has a very excellent performance, converting sugars (e.g. soy molasses sugars) at over 50%, 60%, 70% or 80% yield (i.e. g organic product/g carbon source consumed), over 0.5, 1.0, 1.5, 2 or 2.5 g $L^{-1}$ $h^{-1}$ productivity and reaching high titers (e.g. at least 60, 70, 80, 90, 100, 110, 120, or 130 g/L organic acid or lactic acid).

Methods of detecting organic acids or salts thereof, lactic acid, lactate and/or galacto-oligosaccharides are well known to those skilled in the art. For example, chromatographic methods such as HPLC and ion chromatography can be used. The presence of lactate can be determined e.g. as described in Witte et al. (1989, J. Basic Microbiol. 29:707-716).

A method of the present invention for producing one or more products selected from the group consisting of polymers, polyesters and polylactic acids, comprises culturing a microorganism in a medium comprising the mixture of the present invention (e.g. a mixture comprising legume molasses and calcium hydroxide or a mixture obtained by combining a carbon substrate composition comprising legume molasses and an aqueous suspension comprising calcium hydroxide) to produce an organic acid or a salt thereof, and utilizing the produced organic acid or salt thereof in production of polymers, polyesters and/or polylactic acids. The resulting organic acids or salts thereof are optionally recovered after production and before utilization in production of polymers, polyesters and/or polylactic acids. Production of polymers is a well known method to a person skilled in the art including but not limited to e.g. polymerization of organic acids such as lactic acids.

It will be obvious to a person skilled in the art that, as the technology advances, the inventive concept can be implemented in various ways. The invention and its embodiments are not limited to the examples described below but may vary within the scope of the claims.

EXAMPLES

Example 1—Effect of Calcium Hydroxide Content on Soy Molasses pH

Figure 1:
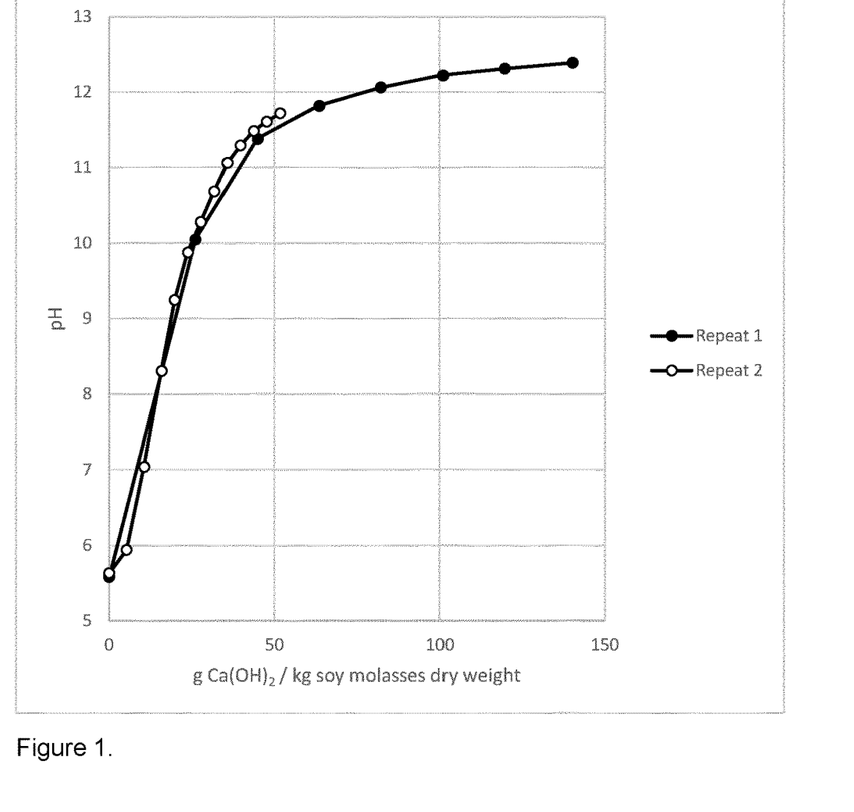
FIG. 1 shows the effect of varying concentrations of $Ca(OH)_2$ on the pH of soy molasses.

Soy molasses with a dry-weight content of 60,7% and density of 1.27 kg/L was combined with a 300 g/L calcium hydroxide suspension at different volumetric ratios, and the pH values of the resulting mixtures recorded using a laboratory pH electrode. The experiment was repeated twice with different ranges of added calcium hydroxide, and the results are plotted in FIG. 1 as grams calcium hydroxide added per kilogram soy molasses (dry weight). While calcium hydroxide solubility in pure water is less than 2 g/L, which is sufficient to reach a pH of approximately 12.4, the results show that some 35-40 grams of calcium hydroxide is needed per kilogram of soy molasses solids to reach pH 11, and some 70-90 grams to reach pH 12.

Example 2—Effect of Different Treatments on Soy Molasses Saponin and Isoflavone Content Soy molasses as such (in-natura), after boiling (10 min), after autoclaving and soy molasses containing different amounts of calcium hydroxide (30, 90 g/L-corresponding to 4.3 g/100 g and 16.7 g/100 g soy molasses dry-weight, respectively) were incubated at room temperature for 1 hour. The samples were analyzed for their saponin and isoflavone content. The total saponin content (FIG. 2) reflected the sum of the concentrations of Deacetylsoyasaponin Ab, Soyasaponin Ba, Soyasaponin Bb1, Soyasaponin Bb2 and Soyasaponin Bb-DDMP. The total isoflavone content (FIG. 3) reflected the sum of the concentrations of Daidzin, Genistin, Glycitin, Daidzein, Acetylgenistin, Glycitein and Genistein.

Figure 2:
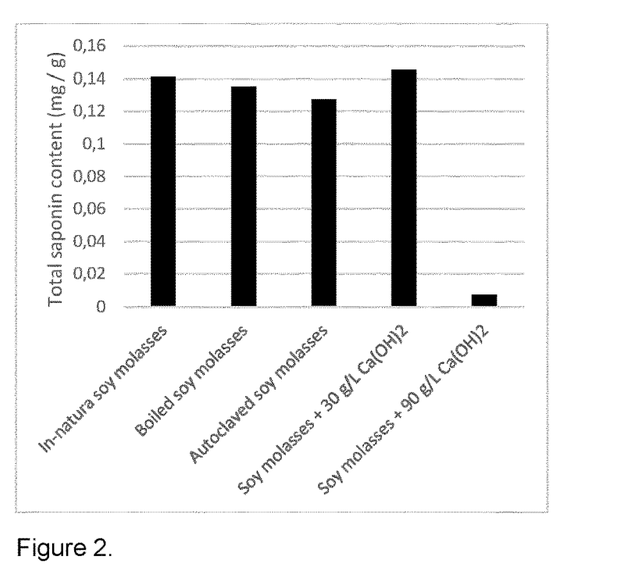
FIG. 2 shows the effect of different physical and chemical treatments on the saponin content of soy molasses.
Figure 3:
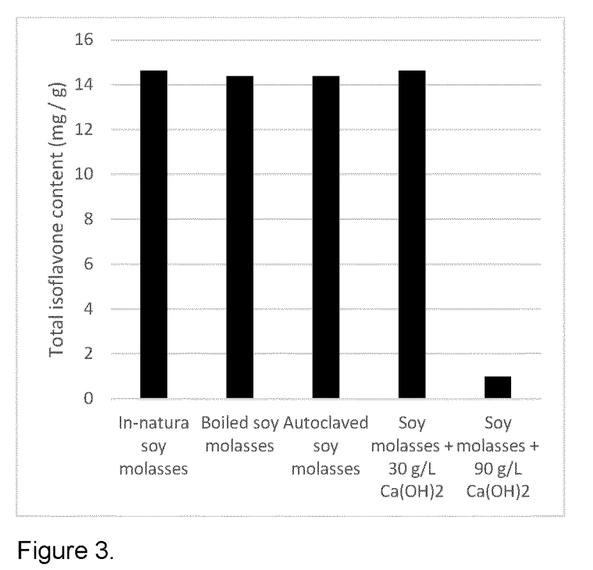
FIG. 3 shows the effect of different physical and chemical treatments on the isoflavone content of soy molasses.

The results show that the higher calcium hydroxide addition leads to significant reductions in soy molasses saponin and isoflavone content. The reduction in saponin content, and possibly also the reduction in isoflavone content can contribute to observed reduced foam formation. Excessive foaming was consistently observed when using autoclaved soy molasses as fermentation feed. The high pH and $Ca^{2+}$ content can also lead to the denaturation and/or precipitation of other potential foam forming agents such as proteins and free fatty acids.

Example 3—Use of Soy Molasses and Alternative Bases for Production of Lactic Acid The lactic acid and alpha-galactosidase producing *S. cerevisiae* strain VTT C-191026 was used to produce lactic acid with different neutralizing bases, namely sodium hydroxide (NaOH), ammonium hydroxide ($NH_3OH$) and calcium hydroxide ($Ca(OH)_2$). Pre-cultures of the strain were grown overnight in YPD medium in shake flasks at 35° C. The cells were recovered by centrifugation at 3000 rpm, 10 minutes. The cells were washed twice with RO—$H_2O$ and finally resuspended for an $OD_{600}$ of 40, corresponding roughly to a cell density of 10 g/L. 1:10 volume of this cell suspension was used to inoculate bioreactor cultivations for lactic acid production from soy molasses carbohydrates.

To compare the production of lactic acid with calcium hydroxide or ammonium hydroxide as neutralizing base, separate feeds were prepared with these bases. The feed with calcium hydroxide was prepared by combining milk of lime with 267 g/L $Ca(OH)_2$ in water with soy molasses at a volumetric ratio 70%:30%, to yield a mixture containing 80 g/L of $Ca(OH)_2$ (corresponding to a concentration of 14.8 g $Ca(OH)_2$/100 g soy molasses dry weight). The feed with ammonium hydroxide was prepared to contain the same volumetric concentration of soy molasses (70%) and normality of base, corresponding to 4% $NH_3OH$. Prior to inoculation, 29 mL of either feed was added to 331 mL pre-sterilized water for an initial volumetric soy molasses concentration of 5.6%. The pH was adjusted to 5.0 using strong sulfuric acid, and the cultivation inoculated with 40 ml of yeast suspension. The pH of the cultivation was maintained at 5.0 by automated addition of the aforementioned combinations of soy molasses with either calcium hydroxide or ammonium hydroxide. Temperature was maintained at 35° C., aeration at 0,3 LPM and agitation at 350 rpm. The fermentation using calcium hydroxide as base consumed all 682 g of feed suspension by 49 hours of fermentation. The fermentation using ammonium hydroxide consumed only 333 g feed suspension during the course of the entire fermentation.

A separate, more conventional fermentation using sodium hydroxide for pH control was carried out as follows: The batch medium was prepared by autoclaving soy molasses diluted to one-sixth of its original concentration in water (16,7 vol %). The reactor was inoculated as in the other fermentations with strain VTT C-191026 to give an initial fermentation volume of 1 liter. Sodium hydroxide (10M) was used to automatically maintain pH above the set point of 5.0. After a 23-hour batch phase, undiluted, autoclaved soy molasses was fed into the reactor at a rate of 14.5 g/h (348 g/d). Adeka nol LG-109 (2 mL) was included in the batch medium as antifoam agent. Antifoam (Adeka nol LG-109 and polypropylene glycol) needed to be added on a regular basis to maintain foaming under control, whereas no antifoam agent was needed in the other fermentations.

Figure 4:
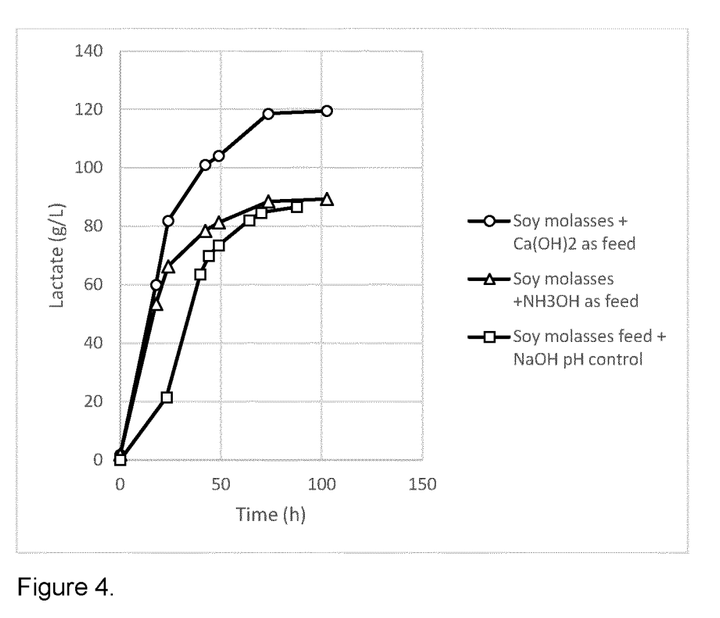
FIG. 4 shows the lactic acid titers quantified from fermentations of soy molasses using modified yeast strain VTT C-191026 and different alkali and/or process configurations.

From all fermenters, samples were withdrawn regularly and formed lactic acid was quantified by HPLC using an Aminex HPX-87H column (Bio Rad), 35° C., 0.3 mL/min flow of 5 mM $H_2SO_4$. Results in grams per liter of lactic acid in fermentation broth, and lactic acid per gram of soy molasses are given in FIG. 4. The results show that using calcium hydroxide mixed into the soy molasses . . . feed, it was possible to reach significantly higher lactic acid titers than using soy molasses mixed with ammonia, or heat-sterilized soy molasses with separate pH control using sodium hydroxide. Additionally, it was noticed that treatment of soy molasses with either alkali eliminated problems that were associated with foaming, while excessive foaming was encountered in the cultivation with heat-sterilized soy molasses. This trend was born out in numerous other cultivations with heat-sterilized and alkali-treated soy molasses.

Example 4—Production of Lactic Acid at Pilot (1 $m^3$) Scale Using a Mixture of soy Molasses and Milk of Lime as Neutralizing Feed The feasibility of using soy molasses combined with milk of lime as a fermentation feed for optically pure lactic acid production was trialed at pilot scale involving two seed train steps. The objective was to evaluate if problems would be encountered at larger scale and if asepticity would be compromised through extended cultivation using non-heat sterilized molasses as feed. Two different feed solutions were prepared for the different cultivation stages. For the seed reactors, the feed was prepared by combining 83,3 vol % soy molasses with 16,7 vol % 300 g/L $Ca(OH)_2$ suspension (milk of lime), for a final calcium hydroxide content of 50 g/L (corresponding to a concentration of 7.8 g $Ca(OH)_2$/100 g soy molasses dry weight). For the pilot production reactor, the feed was prepared by combining 73,3 vol % soy molasses with 26,7 vol % 300 g/L $Ca(OH)_2$ suspension (milk of lime), for a final calcium hydroxide content of 80 g/L (corresponding to a concentration of 14.2 g $Ca(OH)_2$/100 g soy molasses dry weight)

A pre-inoculum of *S. cerevisiae* VTT C-191026 was grown overnight in shake flasks in a total volume of 500 mL of YPD medium, 30° C. This pre-inoculum was used to inoculate the first reactor in the seed train, with a working volume of 10 liters. The first seed reactor had been pre-sterilized with 4.5 liters of tap water. A feed tank containing inoculum feed (83,3 vol % soy molasses and 50 g/L $Ca(OH)_2$) under 1000 rpm agitation at 50° C. was connected to the reactor via a steam-sterilized line through the reactor's base-pump and the pH set-point adjusted to 5.0. Due to the presence of lactic acid in the inoculum, pH was notably below set point, leading to the constant addition of feed slurry comprising soy molasses and milk of lime. Temperature during cultivation was maintained at 35° C. Agitation was controlled using a dissolved oxygen cascade, with set point >50%, to encourage aerobic cell growth.

Once total volume reached >10 L and $CO_2$ evolution plateaued (15-30 h into cultivation), the entire contents of the first seed reactor was transferred to the second seed reactor, which had been pre-sterilized with 40 liters of tap water. Conditions were maintained as in the first seed reactor, with feed of the same composition used to maintain pH above set point (>5.0), until total volume reached >100 L and $CO_2$ evolution plateaued. The entire contents of the second seed reactor were then transferred through a steam-sterilized tube to the final production reactor, which had been pre-sterilized with 400 liters of tap water. In the final production reactor, conditions were maintained the same as in the seed reactors, with the exception, that agitation was kept at a constant low level to maintain DO ~0% to encourage lactic acid production over cell growth. The feed used for the final production reactor comprised less (73,3 vol %) soy molasses and more (80 g/L) Ca(OH)$_2$.

Figure 5:
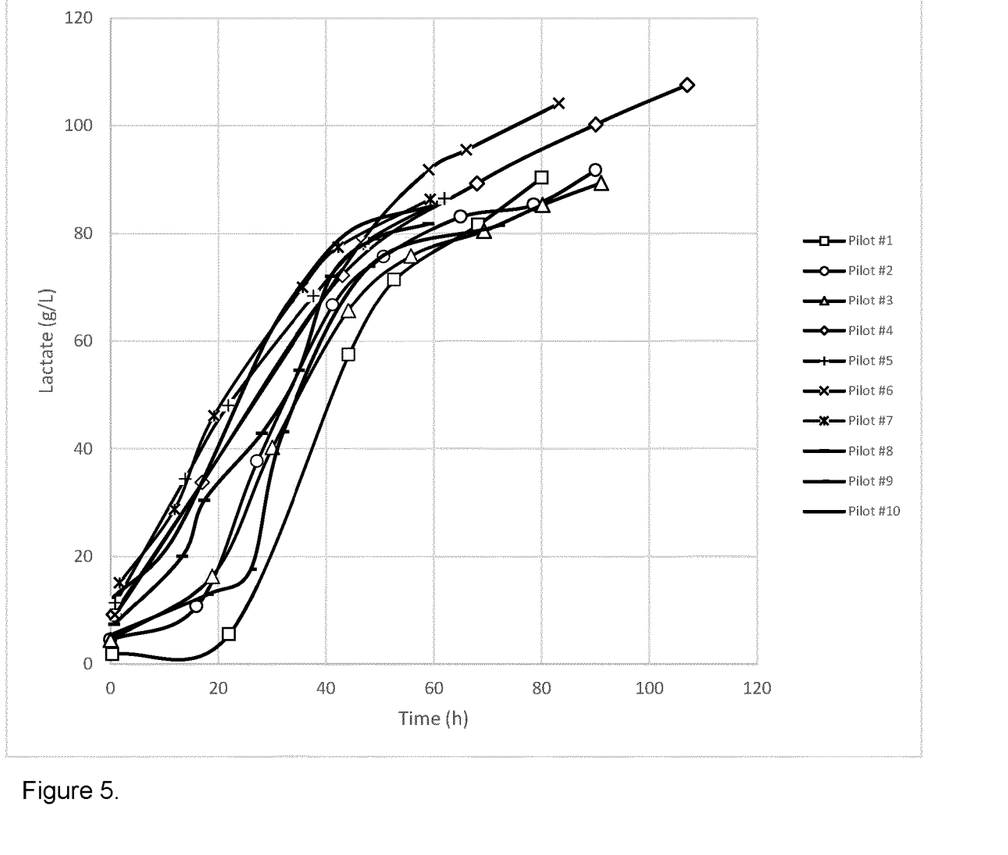
FIG. 5 shows lactic acid titers obtained in 1 $m^3$ scale fermentations using modified yeast strain VTT C-191026 and a feed comprising 73,3 vol % soy molasses with 26,7 vol % 300 g/L $Ca(OH)_2$ suspension

The described fermentation routine was executed ten times, with four separate industrial batches of soy molasses. The lactic acid titers measured from the pilot reactors as a function of time is shown in FIG. 5. Of the described cultures, pilot fermentation 4 suffered a major technical disturbance and its asepticity was compromised. The ratio of the optical isomers of lactic acid (L/D) in the final samples from the seven pilot cultivations are given in Table 1. It can be seen, that in general the process allowed the production of considerably pure L-lactic acid, while pilot 4 having its asepticity compromised showed a marked presence of D-lactic acid produced by contaminating microbes. The results suggest that without technical fault, the process can be performed at large scale and allows production of significantly optically pure lactic acid without heat-sterilization of the feed.

TABLE 1

|  | D-lactic acid (%) | L-lactic acid (%) |
| --- | --- | --- |
| Pilot1 | ≤1 | ≥99 |
| Pilot2 | ≤1 | ≥99 |
| Pilot3 | ≤1 | ≥99 |
| Pilot4* | 27, 2 | 72, 8 |
| Pilot5 | ≤1 | ≥99 |
| Pilot6 | ≤1 | ≥99 |
| Pilot7 | ≤1 | ≥99 |
| Pilot8 | ≤1 | ≥99 |
| Pilot9 | ≤1 | ≥99 |
| Pilot10 | ≤1 | ≥99 |

*Asepticity compromised

The invention claimed is:

1. A method of producing an organic acid or a salt thereof, wherein said method comprises
    combining a carbon substrate composition comprising legume molasses and an aqueous suspension comprising calcium hydroxide to obtain a mixture, wherein said mixture has a calcium hydroxide content of at least 4 g (dry weight)/100 g (dry weight) of legume molasses,
    culturing a microorganism in a medium comprising said mixture to obtain an organic acid or a salt thereof, and
optionally isolating and/or purifying the organic acid or salt thereof.

2. The method of claim 1, wherein a temperature of the carbon substrate composition is about 80° C. or less, 70° C. or less, 60° C. or less, or 50° C. or less when it is combined with the aqueous suspension comprising calcium hydroxide, and/or wherein the mixture has a temperature about 80° C. or less, 70° C. or less, 60° C. or less, 50° C. or less, or 40° C. or less when said mixture is added to the medium for culturing the microorganism.

3. The method of claim 1, wherein pH of the medium is controlled by adding the mixture or the aqueous suspension to the medium.

4. The method of claim 1 further comprising preparing a polymer, polyester or polylactic acid from the obtained organic acid or salt thereof.

5. The method of claim 1, wherein the mixture has a calcium hydroxide content of at least 5 g/100 g (dry matter) of legume molasses, or at least 6 g/100 g (dry matter) of legume molasses, and/or pH at least 11.

6. The method of claim 1, wherein the legume molasses, carbon substrate or carbon substrate composition comprises galacto-oligosaccharides at least about 10%, 20%, 30%, 40%, 50%, 60%, 70%, 80%, or 90% by weight of the total carbohydrates in said legume molasses or carbon substrate.

7. The method of claim 1, wherein the legume molasses, carbon substrate or carbon substrate composition comprises galacto-oligosaccharides selected from the group consisting of melibiose, manninotriose, manninotetraose, raffinose, stachyose, verbascose, ajucose, galactinol, digalactosyl myo-inositol, galactopinitol A, galactopinitol B, ciceritol, fagopyritol B1, fagopyritol B2 and any combination thereof.

8. The method of claim 1, wherein the legume molasses, carbon substrate or carbon substrate composition comprises glucose, fructose, galactose, sucrose, lactose, maltose, starch, cellulose and/or any combination thereof.

9. The method of claim 1, wherein the legume molasses or galacto-oligosaccharides are from soya, fava bean, broad bean, peas, chickpeas, or any combination thereof; or the legume molasses comprises molasses of soya, fava bean, broad bean, peas and/or chickpeas.

10. The method of claim 1, wherein the organic acid or salt thereof is selected from the group consisting of a lactic acid, preferably optically pure lactic acid isomer, typically L-lactic acid isomer; acetic acid; formic acid; pyruvic acid; butyric acid; citric acid; oxalic acid; glycolic acid; gluconic acid; and furan-dicarboxylic acid (FDCA); and or any combination thereof.

11. The method of claim 1, wherein the microorganism is a fungus, optionally a yeast or filamentous fungus.

* * * * *